(12) United States Patent
Hibino

(10) Patent No.: US 11,478,938 B2
(45) Date of Patent: Oct. 25, 2022

(54) SHEET CONVEYING DEVICE AND SHEET CONVEYING METHOD

(71) Applicant: KAWASAKI JUKOGYO KABUSHIKI KAISHA, Kobe (JP)

(72) Inventor: Satoru Hibino, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 369 days.

(21) Appl. No.: 16/608,557

(22) PCT Filed: Apr. 24, 2018

(86) PCT No.: PCT/JP2018/016554
§ 371 (c)(1),
(2) Date: Oct. 25, 2019

(87) PCT Pub. No.: WO2018/199066
PCT Pub. Date: Nov. 1, 2018

(65) Prior Publication Data
US 2020/0086499 A1    Mar. 19, 2020

(30) Foreign Application Priority Data

Apr. 25, 2017    (JP) .............................. JP2017-086457

(51) Int. Cl.
*B25J 9/16* (2006.01)
*B25J 13/08* (2006.01)
(Continued)

(52) U.S. Cl.
CPC ........... *B25J 13/081* (2013.01); *B25J 9/1612* (2013.01); *B25J 9/1697* (2013.01);
(Continued)

(58) Field of Classification Search
CPC ...... B25J 13/081; B25J 9/1612; B25J 9/1697; B65G 49/061; B65H 5/08; B65H 7/02; B65H 2553/40
(Continued)

(56) References Cited

U.S. PATENT DOCUMENTS 4,662,925 A * 5/1987 Thimons ................. C03B 35/14
65/273
4,666,493 A * 5/1987 Frank ..................... C03B 35/145
65/273
(Continued)

FOREIGN PATENT DOCUMENTS

JP    H01-222879 A    9/1989
JP    H01-156838 U    10/1989
(Continued)

OTHER PUBLICATIONS

Jul. 17, 2018 Search Report issued in International Patent Application No. PCT/JP2018/016554.

*Primary Examiner* — Jaime Figueroa
(74) *Attorney, Agent, or Firm* — Oliff PLC

(57) ABSTRACT

A sheet conveying device and a sheet conveying method whereby it is possible to convey a sheet more accurately. This sheet conveying device includes a holder capable of holding a sheet, bringing the sheet into a stretched state while holding the sheet, and conveying the held sheet. This sheet conveying device also includes a sheet state recognizer that recognizes the state of the sheet when the sheet is held in a stretched state by the holder.

10 Claims, 9 Drawing Sheets

(51) Int. Cl.
  *B25J 15/06* (2006.01)
  *B65G 47/91* (2006.01)
  *B65G 49/06* (2006.01)
  *B65H 5/08* (2006.01)
  *B65H 7/02* (2006.01)
(52) U.S. Cl.
  CPC .......... *B25J 15/0616* (2013.01); *B65G 47/91* (2013.01); *B65G 49/061* (2013.01); *B65H 5/08* (2013.01); *B65H 7/02* (2013.01); *B65G 2249/04* (2013.01); *B65H 2553/40* (2013.01)
(58) Field of Classification Search
  USPC .................................................. 700/245–264
  See application file for complete search history.

(56) References Cited

U.S. PATENT DOCUMENTS

| | | | | |
|---|---|---|---|---|
| 4,666,496 A * | 5/1987 | Fecik | .................. | C03B 23/03 65/273 |
| 5,735,922 A * | 4/1998 | Woodward | ............ | C03B 23/033 65/104 |
| 6,192,140 B1 * | 2/2001 | Reinhard | ................. | B41F 33/02 101/DIG. 42 |
| 6,260,456 B1 * | 7/2001 | Schaede | ................. | B65H 35/02 83/34 |
| 6,508,172 B2 * | 1/2003 | Kusaka | .................. | B65H 31/24 101/483 |
| 6,539,863 B2 * | 4/2003 | Shiraishi | ............... | B41F 31/045 347/15 |
| 7,073,444 B2 * | 7/2006 | Alonso | .................. | G06T 7/0004 101/484 |
| 7,845,529 B2 * | 12/2010 | Okajima | .............. | B65G 49/061 414/763 |
| 8,777,216 B2 * | 7/2014 | Otsuka | .................. | B65H 5/224 271/194 |
| 8,857,809 B2 * | 10/2014 | Toyooka | ................ | B65H 7/02 271/18.1 |
| 9,149,956 B2 * | 10/2015 | Itani | ...................... | B29C 31/006 |
| 9,156,193 B2 * | 10/2015 | Itani | ...................... | B29C 59/02 |
| 9,452,563 B2 * | 9/2016 | Itani | ...................... | B29C 59/04 |
| 9,649,787 B2 * | 5/2017 | Itani | ...................... | B29C 59/02 |
| 9,850,085 B2 * | 12/2017 | Türke | ................... | B65H 43/06 |
| 10,618,760 B2 * | 4/2020 | Ishioka | .................. | B65H 5/062 |
| 11,220,410 B2 * | 1/2022 | Miyagawa | .............. | B65H 7/16 |
| 2001/0045755 A1 | 11/2001 | Schick et al. | | |
| 2003/0141653 A1 * | 7/2003 | Kumamoto | .............. | G07D 7/17 271/262 |
| 2003/0152679 A1 * | 8/2003 | Garwood | ............. | B65D 81/264 426/392 |
| 2008/0190981 A1 * | 8/2008 | Okajima | ............... | C03B 33/033 225/2 |
| 2009/0236384 A1 * | 9/2009 | Okajima | ............... | C03B 33/027 225/2 |
| 2012/0313289 A1 * | 12/2012 | Itani | ........................ | B29C 59/02 425/441 |
| 2012/0326346 A1 * | 12/2012 | Itani | ........................ | B29C 59/02 425/150 |
| 2013/0011507 A1 * | 1/2013 | Itani | ...................... | B29C 33/424 425/150 |
| 2013/0011511 A1 * | 1/2013 | Itani | ........................ | B29C 59/04 425/385 |
| 2013/0300053 A1 * | 11/2013 | Otsuka | .................. | B65H 5/224 271/103 |
| 2014/0070479 A1 * | 3/2014 | Toyooka | ................ | B65H 3/047 271/10.02 |
| 2015/0367517 A1 | 12/2015 | Eisele et al. | | |
| 2016/0018587 A1 | 1/2016 | Koraishy | | |
| 2016/0286699 A1 | 9/2016 | Hara | | |
| 2018/0218558 A1 * | 8/2018 | Danjo | ...................... | B65H 7/02 |
| 2018/0273322 A1 * | 9/2018 | Ohno | ........................ | B65H 7/20 |
| 2019/0023511 A1 * | 1/2019 | Ishioka | .................. | B65H 5/062 |
| 2019/0366252 A1 * | 12/2019 | Tate | ....................... | B01D 46/526 |
| 2020/0039772 A1 * | 2/2020 | Miyagawa | .............. | B65H 7/02 |

FOREIGN PATENT DOCUMENTS

| | | |
|---|---|---|
| JP | H05-217014 A | 8/1993 |
| JP | H06-216496 A | 8/1994 |
| JP | 2000-128372 A | 5/2000 |
| JP | 2002-246433 A | 8/2002 |
| JP | 2004-174685 A | 6/2004 |
| JP | 2005-88556 A | 4/2005 |
| JP | 2013-211364 A | 10/2013 |
| JP | 2016-49620 A | 4/2016 |
| WO | 2006/108409 A1 | 10/2006 |
| WO | 2016/193785 A1 | 12/2016 |

\* cited by examiner

[Fig. 1]
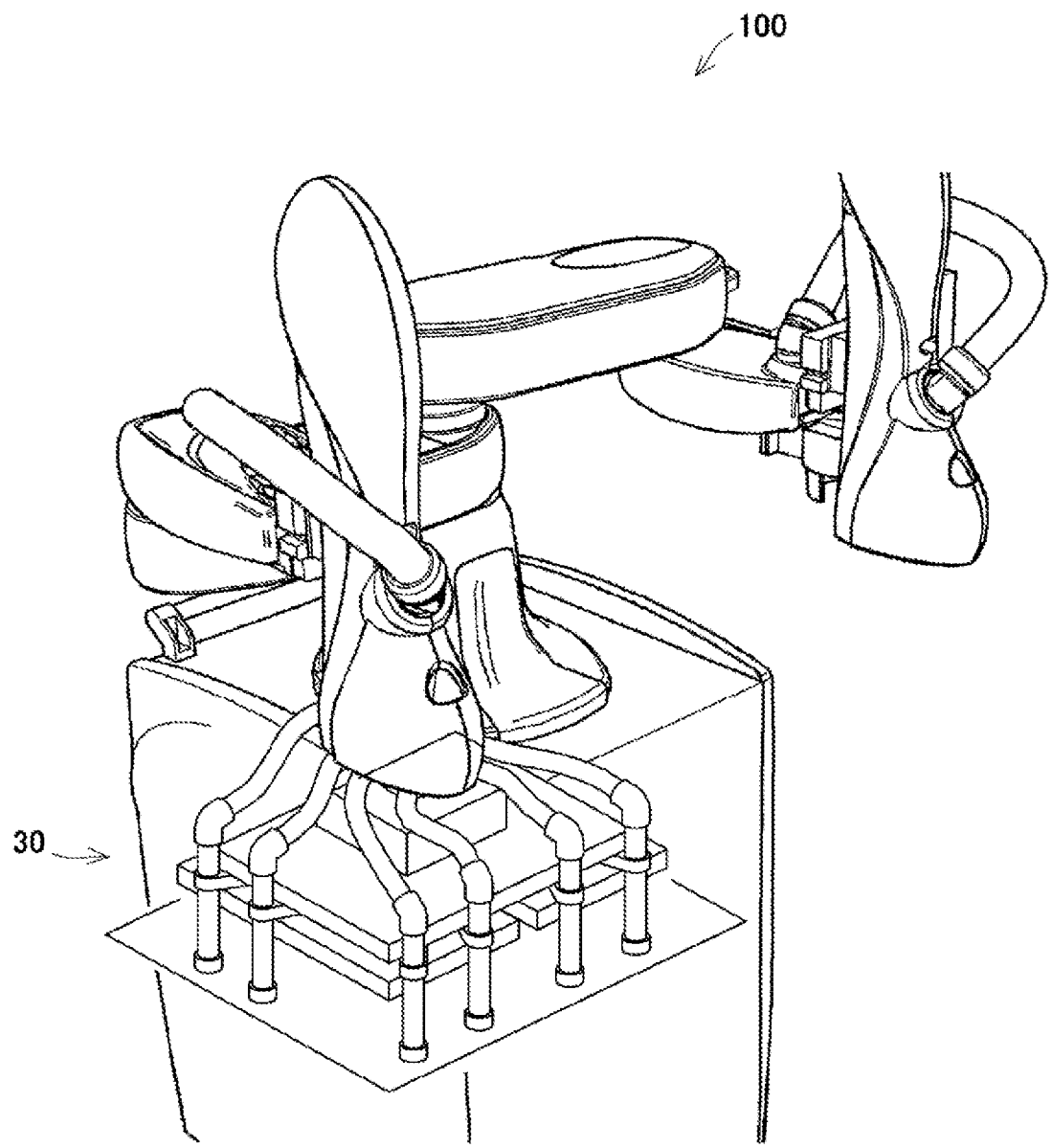

[Fig. 2]
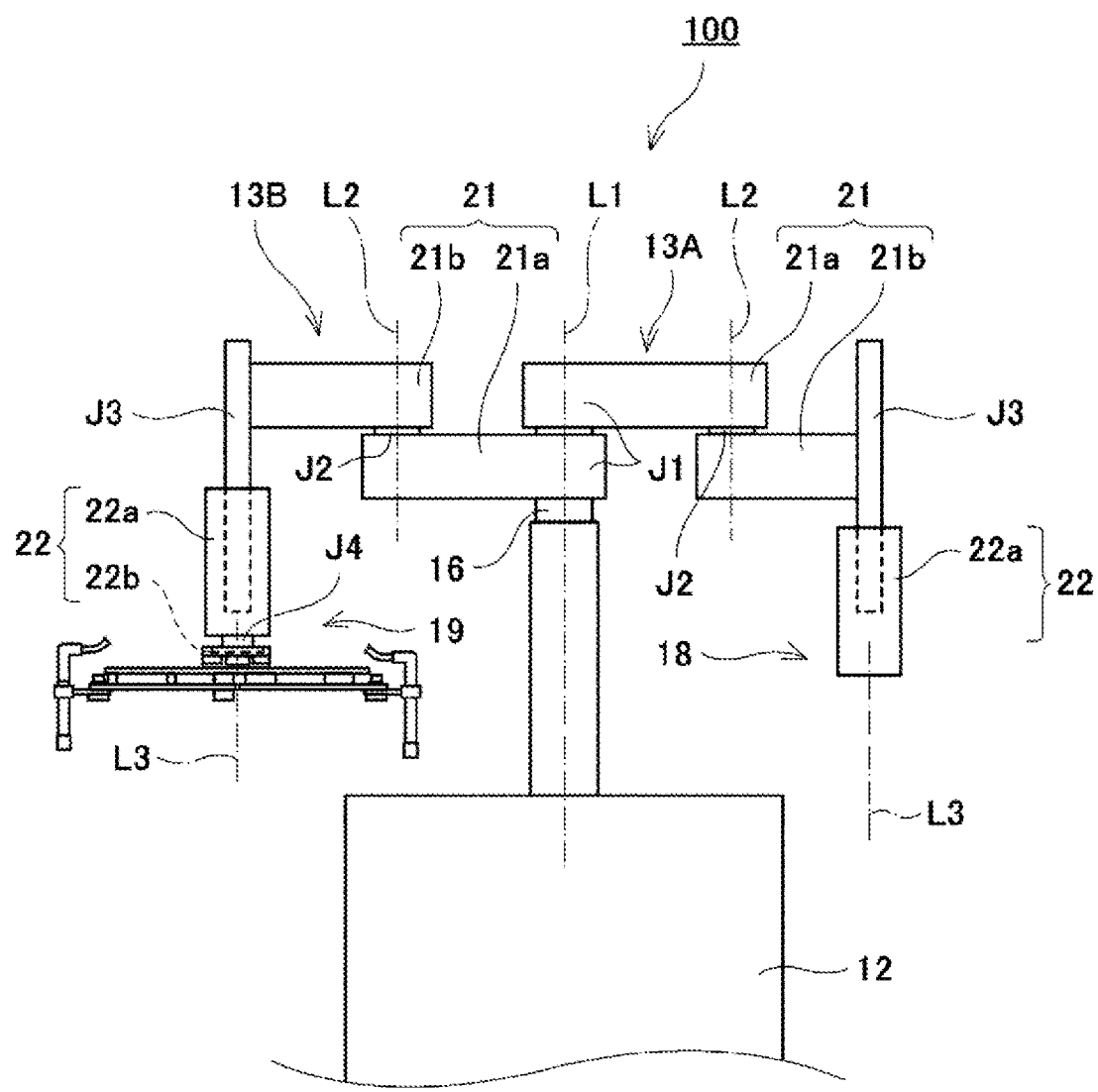

[Fig. 3]
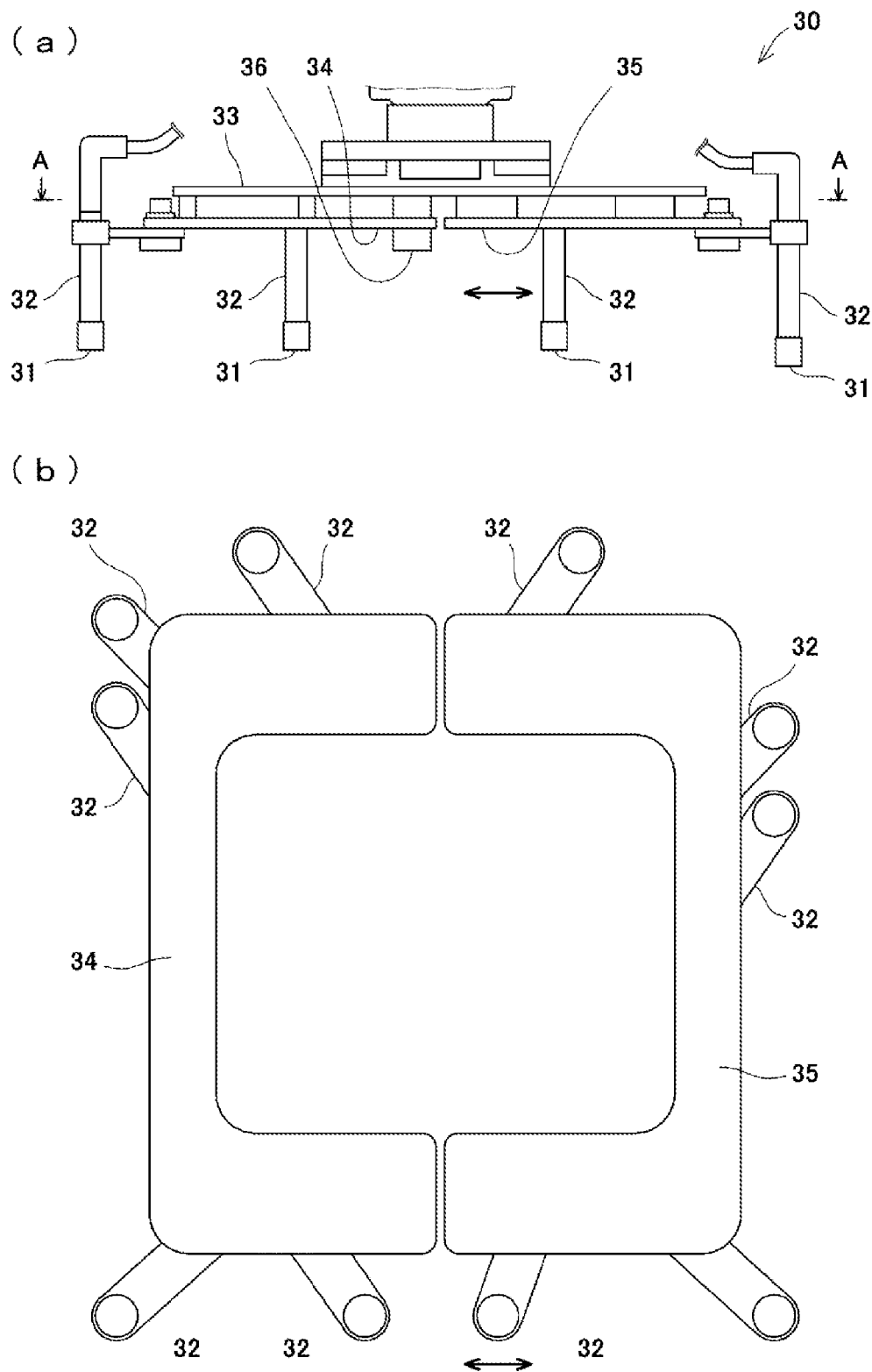

[Fig. 4]
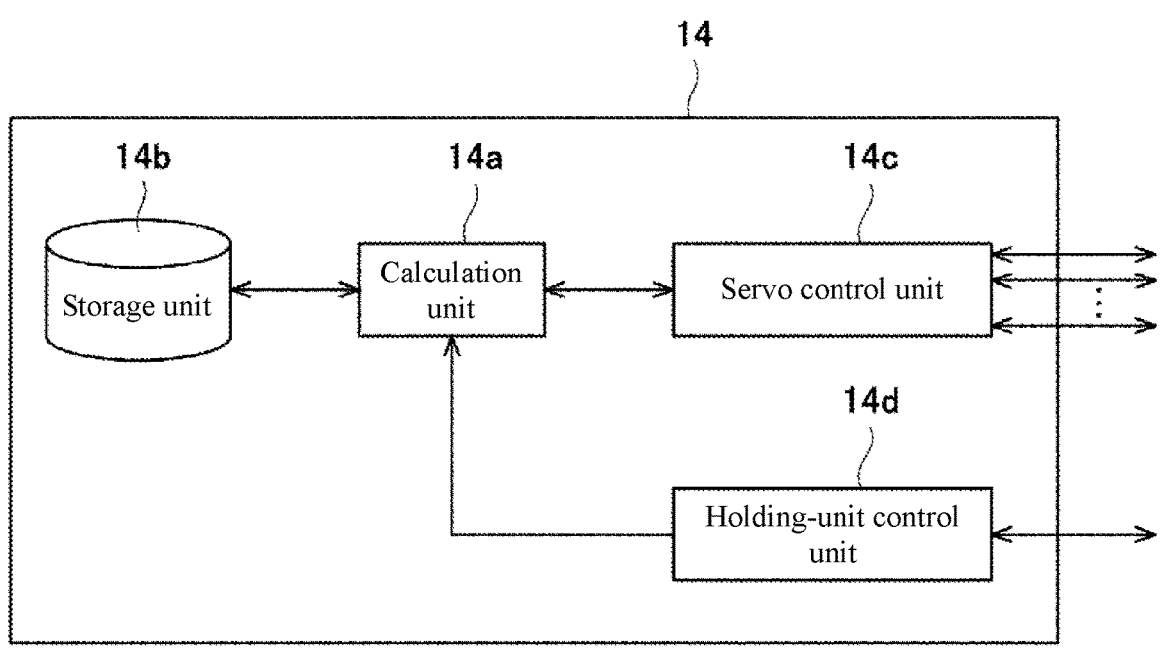

[Fig. 5]
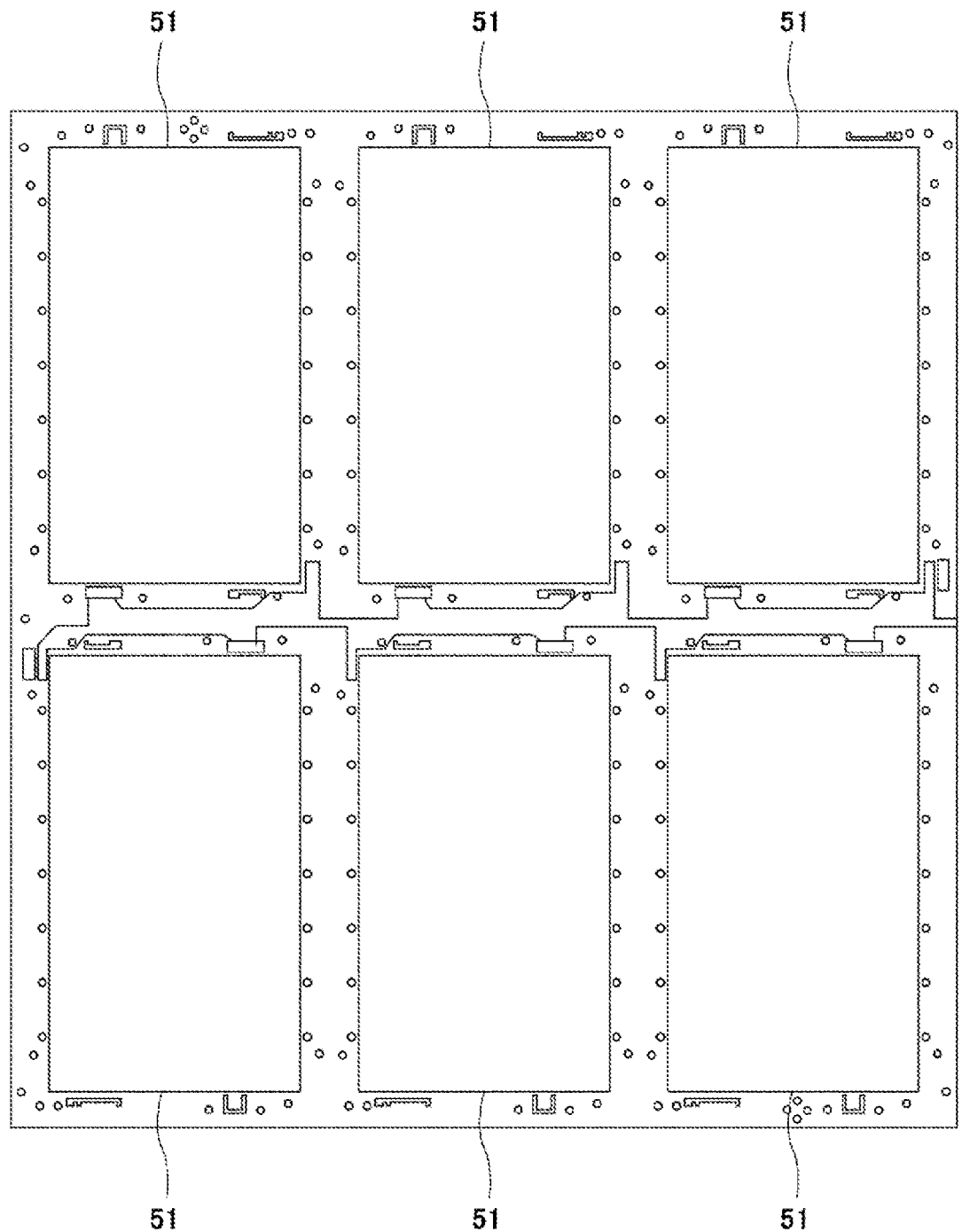

[Fig. 6]
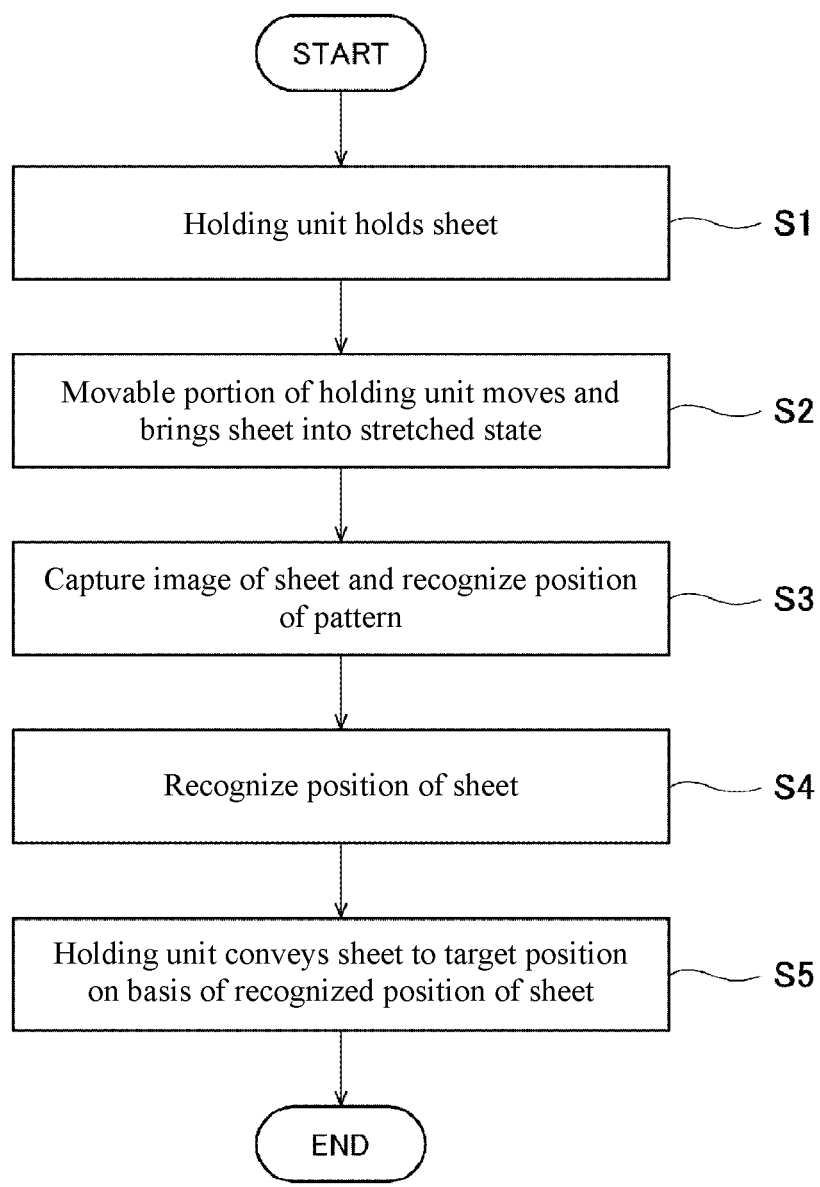

[Fig. 7]
(a)
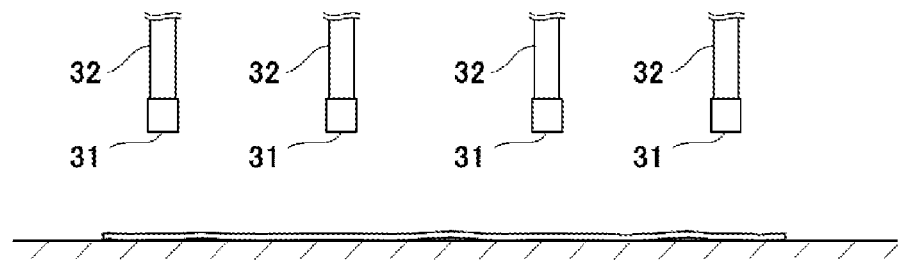
(b)
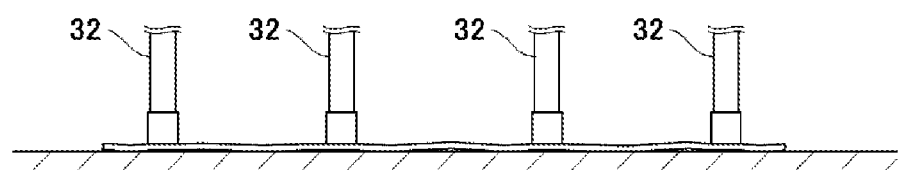
(c)
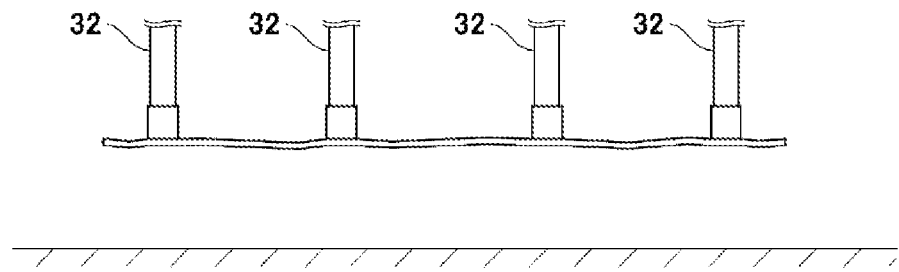
(d)
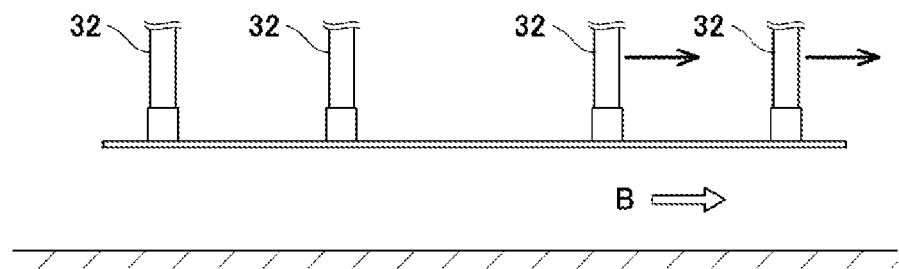

[Fig. 8]
(a)
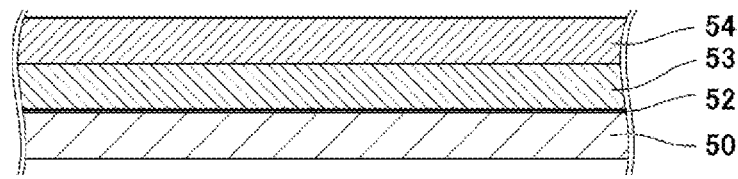
(b)
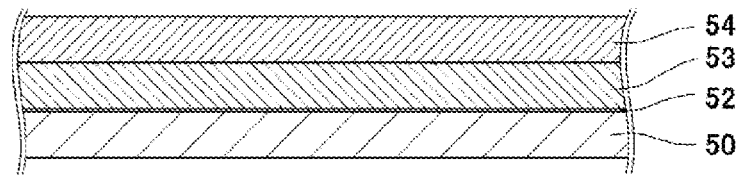
(c)
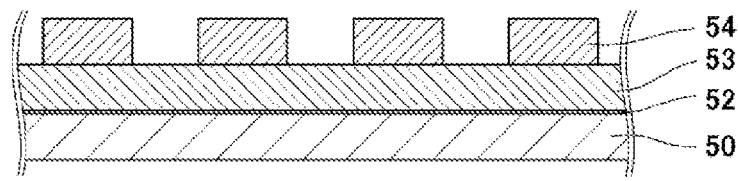
(d)
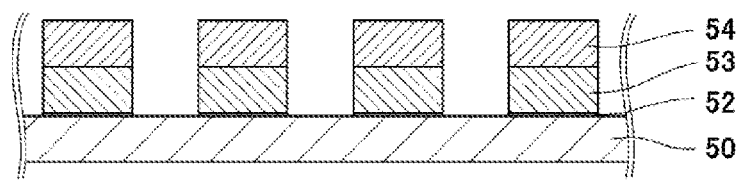
(e)
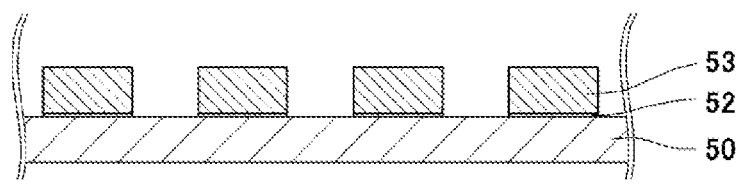

[Fig. 9]
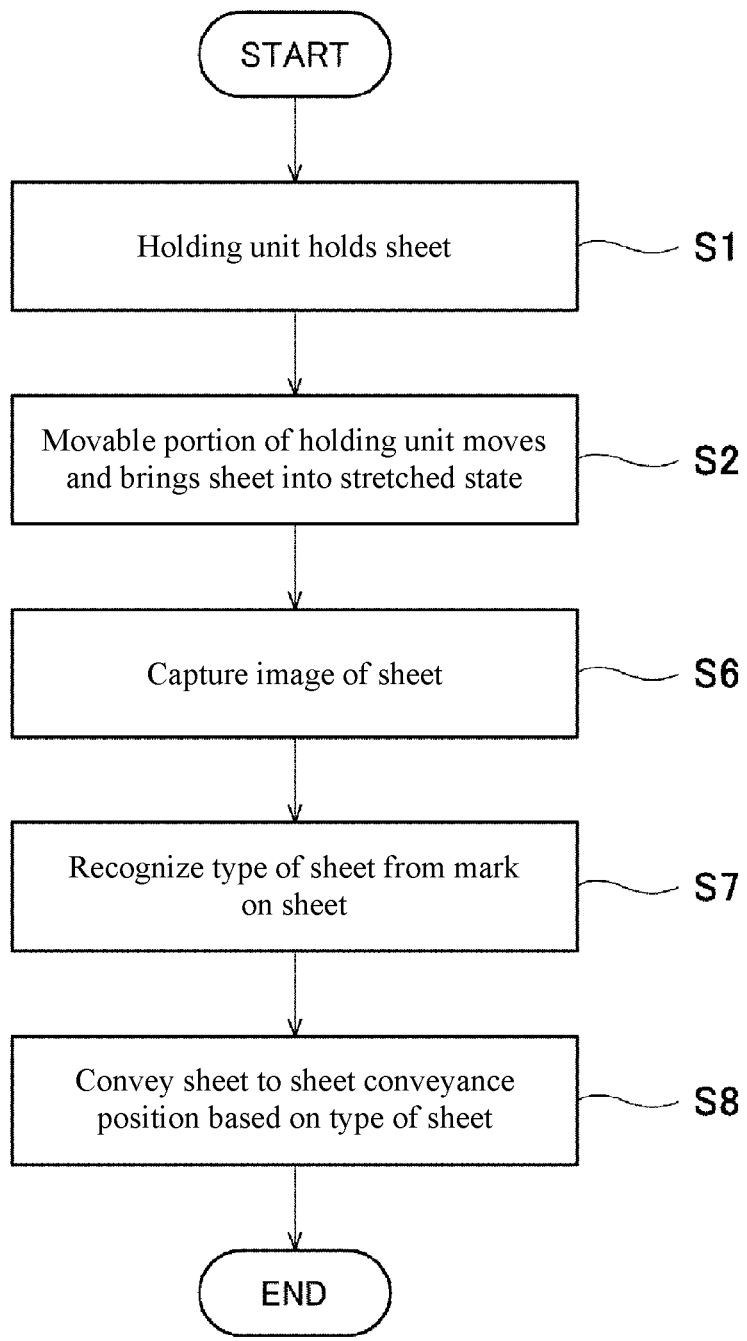

SHEET CONVEYING DEVICE AND SHEET CONVEYING METHOD

TECHNICAL FIELD

The present invention relates to a sheet conveying device and sheet conveying method for conveying a held sheet to a predetermined position.

BACKGROUND ART

Conventionally, a method for conveying a sheet using a jig that holds the sheet in a stretched state is used. PTL 1 discloses a jig that holds a sheet in a stretched state.

In PTL 1, the jig has pins, and holes are provided in the sheet. The pins are urged outward by springs and mounted to the jig. The pins are inserted in the holes of the sheet and urged outward, thereby holding the sheet in a stretched state. The configuration is such that the sheet can be conveyed to a predetermined position while being held in a stretched state.

CITATION LIST

Patent Literature

PTL 1: Unexamined Japanese Patent Publication No. 6-216496

SUMMARY OF INVENTION

Technical Problem

However, with the jig disclosed in PTL 1, it may not be possible to recognize whether or not the sheet is normally held by the jig. If a displaced sheet is held by the jig and conveyed, the conveyance accuracy of the sheet may thus be lowered. Conveying the sheet as it is may affect the subsequent steps. For example, in cases where a circuit is formed on the sheet to produce a flexible substrate, that could lead to problems in which the circuit cannot be accurately printed on the sheet and the quality of the produced substrate is deteriorated.

In view of the above circumstances, an object of the present invention is to provide a sheet conveying device and a sheet conveying method such that it is possible to convey a sheet more accurately.

Solution to Problem

The sheet conveying device according to the present invention includes: a holder capable of holding a sheet, bringing the sheet into a stretched state while holding the sheet, and conveying the held sheet; and a sheet state recognizer that recognizes a state of the sheet when the sheet is held in a stretched state by the holder.

With the sheet conveying device having the above configuration, the sheet is brought into a stretched state and the state of the sheet is recognized, and then the sheet is conveyed. Thus, it is possible to convey the sheet with high accuracy.

Furthermore, the sheet state recognizer may recognize a position of the sheet.

Since the position of the sheet is recognized, it is possible to accurately convey the sheet to a conveyance position to which the sheet is to be conveyed.

Furthermore, the holder may convey the sheet to a conveyance target position on the basis of the position of the sheet recognized by the sheet state recognizer.

Since the sheet is conveyed to the conveyance target position on the basis of the recognized position of the sheet, it is possible to more accurately convey the sheet to the conveyance position.

Further, the sheet state recognizer may recognize, from the recognized position of the sheet, whether or not the sheet can be conveyed to the conveyance target position by the holder.

Since the sheet is conveyed after it is recognized whether or not the sheet can be conveyed to the conveyance target position, all sheets to be conveyed can be reliably conveyed. It is therefore possible to provide a highly-reliable sheet conveying device.

Furthermore, the sheet may be provided with a pattern, and the sheet state recognizer may recognize the position of the sheet by recognizing a position of the pattern.

Since the position of the sheet is recognized from the position of the pattern provided on the sheet, it is possible to accurately recognize the position of the sheet.

Moreover, the sheet may be divided into a plurality of regions, and the pattern may be a line that divides each of the plurality of regions.

Since the line dividing each of the plurality of regions as originally formed on the sheet is used as a pattern to recognize the position of the sheet, there is no need to newly provide a pattern to recognize the position of the sheet and the applicable range of the sheet can be widened.

Furthermore, a single substrate may be produced from one of the plurality of divided regions in the sheet.

Since a single substrate is produced from one of the plurality of divided regions in the sheet, the sheet can be used efficiently.

In addition, the sheet state recognizer may recognize a type of the sheet.

Since the type of the sheet is recognized, it is possible to convey the sheet to the conveyance position for each type.

Further, the sheet may be conveyed to a sheet conveyance position allocated for each type on the basis of the type of the sheet recognized by the sheet state recognizer.

Since the sheet is conveyed to the sheet conveyance position allocated for each type on the basis of the recognized type of the sheet, it is possible to accurately convey the sheet to the allocated conveyance position.

Furthermore, the sheet may be provided with an identifier that indicates the type of the sheet, and the sheet state recognizer may recognize the type of the sheet from the identifier.

Since the type of the sheet is recognized from the identifier, it is possible to accurately recognize the type of the sheet. Since the sheet is conveyed to the sheet conveyance position allocated for each type on the basis of the recognized type of the sheet, it is possible to accurately convey the sheet to the allocated conveyance position.

Further, the identifier may be a mark.

Further, the identifier may be a design.

Moreover, the sheet state recognizer may have an imaging unit that captures an image of the sheet, and the sheet state recognizer may recognize the state of the sheet from the image captured by the imaging unit.

Since the state of the sheet is recognized from the image captured by the imaging unit, it is possible to accurately recognize the state of the sheet.

Furthermore, the holder may be configured from a robot arm.

A sheet conveying method for conveying a sheet using a sheet conveying device including a holder capable of holding a sheet, bringing the sheet into a stretched state, and conveying the sheet, and a sheet state recognizer that recognizes a state of the sheet, the method including: a sheet holding step of holding the sheet; a sheet stretching step of bringing the sheet into a stretched state; a sheet state recognition step of recognizing the state of the sheet; and a sheet conveying step of conveying the sheet.

After the sheet stretching step of bringing the sheet into a stretched state, the sheet state recognition step of recognizing the state of the sheet is performed, and then the sheet conveying step is performed. Thus, it is possible to convey the sheet with high accuracy.

Advantageous Effects of Invention

According to the present invention, since the sheet is conveyed after the state of the held sheet is recognized, it is possible to convey the sheet more accurately and improve the conveyance accuracy of the sheet.

BRIEF DESCRIPTION OF DRAWINGS

FIG. 1 is a perspective view of a sheet conveying device according to a first embodiment of the present invention.

FIG. 2 is a front view of the sheet conveying device of FIG. 1.

FIG. 3(a) is a front view of a holding unit used in the sheet conveying device of FIG. 1, and FIG. 3(b) is a plan view of a fixed plate, a movable portion, and suction pipes as viewed in the direction of line A-A of FIG. 3(a).

FIG. 4 is a block diagram showing a configuration of a control system of the sheet conveying device of FIG. 1.

FIG. 5 is a plan view of a sheet to be conveyed by the sheet conveying device of FIG. 1.

FIG. 6 is a flowchart when the sheet is conveyed by the sheet conveying device of FIG. 1.

FIG. 7 is a front view of the holding unit and the sheet, showing the steps from when the sheet is held by the sheet conveying device of FIG. 1 to when the sheet is brought into a stretched state.

FIG. 8 is a cross-sectional view of the sheet, showing the steps when a circuit is formed on the sheet conveyed by the sheet conveying device of FIG. 1 to produce a substrate.

FIG. 9 is a flowchart when a sheet is conveyed by a sheet conveying device according to a second embodiment of the present invention.

DESCRIPTION OF EMBODIMENTS

Hereinafter, a sheet conveying device and a sheet conveying method according to embodiments of the present invention will be described with reference to the accompanying drawings.

FIG. 1 is a perspective view of a sheet conveying device 100 according to a first embodiment. The sheet conveying device 100 is configured so that a sheet can be held by a holding unit 30 that is held by a robot arm. The configuration is such that the sheet can be conveyed while being held by the holding unit 30.

Here, the "sheet" includes a wide range of sheets which are formed thin and thus easily deformed and are not maintained in shape. Examples of the sheet include thin sheets which are formed from cloth, plastic, film, wood, leather, and the like. The sheet also includes functional sheets, such as clothing, formed from the above-described materials. The sheet includes a wide range of sheets which are formed thin so as to be changeable from a deformed state to a stretched state.

The sheet conveying device 100 is configured from a horizontal articulated dual-arm robot which is equipped with a pair of robot arms 13. FIG. 2 shows a front view of the sheet conveying device 100.

The sheet conveying device 100 is equipped with a first robot arm 13A and a second robot arm 13B. A first holding portion 18 is provided at the leading end of the first robot arm 13A. A second holding portion 19 is provided at the leading end of the second robot arm 13B. Hereinafter, the first robot arm 13A and the second robot arm 13B may be simply referred to as the robot arm 13 if the two robot arms are not distinguished from each other.

The sheet conveying device 100 is equipped with a control unit 14 and a vacuum generator (not shown).

The control unit 14 is provided, for example, within a support base 12 of the sheet conveying device 100. However, the location of the control unit 14 is not limited to this, but may be provided, for example, within the robot arm 13. Alternatively, the control unit 14 may be provided in another empty space.

The vacuum generator is, for example, a vacuum pump, CONVUM (registered trademark), or the like, and is provided, for example, within the support base 12. However, the location of the vacuum generator is not limited to this, but may be provided in other places, such as within the robot arm 13. The vacuum generator is connected to the suction port of the holding unit 30 through a pipe (not shown). For example, an opening-closing valve (not shown) is provided in the pipe, and the pipe is opened and closed by the opening-closing valve. The operation of the vacuum generator and the opening and closing of the opening-closing valve are controlled by a control device.

The first robot arm 13A moves the first holding portion 18 within a predetermined operating range. Furthermore, the second robot arm 13B moves the second holding portion 19 within a predetermined operating range. The robot arm 13 is, for example, a horizontal articulated robot arm, and includes an arm portion 21 and a wrist portion 22. Furthermore, the first robot arm 13A and the second robot arm 13B can operate independently of each other or operate in conjunction with each other.

The sheet conveying device 100 is equipped with the support base 12 and a base shaft 16 that extends vertically upward from the support base 12. The base shaft 16 is mounted to the support base 12 so as to be capable of rotary motion.

The arm portion 21 is mounted to the base shaft 16 so as to extend in the horizontal direction. The arm portion 21 is mounted so as to be rotatable about the base shaft 16.

The arm portion 21 includes a first link 21a and a second link 21b. The first link 21a and the second link 21b are rotatably supported with each other along the horizontal direction. The first robot arm 13A and the second robot arm 13B are each connected to the base shaft 16 with the arm portion 21 interposed therebetween.

The arm portion 21 positions the wrist portions 22 mounted to the leading ends of the first robot arm 13A and the second robot arm 13B at an optional position within an operation range.

The first link 21a is coupled at the base end to the base shaft 16 of the support base 12 by a rotary joint J1 and can be turned about a rotary axis L1 that passes through the axis of the base shaft 16. The second link 21b is coupled to the leading end of the first link 21*a* by a rotary joint J2 and can be turned about a rotary axis L2 that is defined by the leading end of the first link 21*a*.

The wrist portion 22 changes a mechanism connected to the leading end thereof to an optional orientation. The wrist portion 22 includes an elevating portion 22*a* and a turning portion 22*b*. The elevating portion 22*a* is coupled to the leading end of the second link 21*b* by a linear-motion joint J3 and is vertically movable with respect to the second link 21*b*. The turning portion 22*b* is coupled to the lower end of the elevating portion 22*a* by a rotary joint J4, and can be turned about a rotary axis L3 that is defined by the lower end of the elevating portion 22*a*.

In this embodiment, the rotary axes L1 to L3 are parallel to each other, and extend, for example, in the vertical direction. Further, the extending direction of the rotary axes L1 to L3 and the vertical movement direction of the elevating portion 22*a* are parallel to each other.

A servomotor (not shown) for driving, an encoder (not shown) for detecting the rotational angle of the servomotor, and the like are provided to the arm 13 so as to correspond to each of the joints J1 to J4. The rotary axis L1 of the first robot arm 13A and the rotary axis L1 of the second robot arm 13B are collinear, and the first link 21*a* of the first robot arm 13A and the first link 21*a* of the second robot arm 13B are arranged with a vertical height difference.

Next, a hand portion in which the first holding portion 18 and the second holding portion 19 can grip the holding unit 30 will be described. In this embodiment, the second holding portion 19 serves as a hand portion to grip the holding unit (holder) 30.

The holding unit 30 will be described. FIG. 3(*a*) shows a front view of the holding unit 30, and FIG. 3(*b*) shows a plan view of a fixed plate 34, movable portion 35, and suction pipes 32 of the holding unit 30 as viewed in the direction of line A-A of FIG. 3(*a*).

As shown in FIGS. 3(*a*) and 3(*b*), the plurality of suction pipes 32 are provided to the holding unit 30. In this embodiment, ten suction pipes 32 are provided at positions corresponding to the outer edge of the sheet to be conveyed. A suction port 31 is provided in the leading end of each of the suction pipes 32. In this embodiment, the ten suction ports 31 are provided corresponding to the suction pipes 32.

The suction pipes 32 are connected to the vacuum generator. Air can be sucked in from the suction ports 31 by suction from the suction ports 31 through the suction pipes 32. By suction from the suction ports 31 being in contact with the sheet, the sheet can be attached to the suction ports 31.

The holding unit 30 is equipped with a support plate 33. The holding unit 30 is also equipped with the fixed plate 34 that is fixedly mounted to the support plate 33. The holding unit 30 is also equipped with the movable portion 35 that is mounted to the holding unit 30 so as to be movable with respect to the fixed plate 34. The fixed plate 34 and the movable portion 35 are connected to the support plate 33, which supports the fixed plate 34 and the movable portion 35. The movable portion 35 is connected to the support plate 33 so as to be movable with respect to the support plate 33.

The suction pipes 32 are mounted to the fixed plate 34 or the movable portion 35. In this embodiment, among the ten suction pipes 32, five suction pipes 32 are mounted to the fixed plate 34, and five suction pipes 32 are mounted to the movable portion 35. In this manner, among the plurality of suction pipes 32, some of the suction pipes 32 are mounted to the fixed plate 34, and the remaining suction pipes 32 are mounted to the movable portion 35. Thus, the configuration is such that the remaining suction pipes 32 are movable with respect to some of the suction pipes 32. Consequently, the configuration is such that some of the suction pipes 32 are fixedly mounted to the holding unit 30, and the remaining suction pipes 32 are movable with respect to the holding unit 30.

It should be noted that this embodiment is configured such that the five suction pipes 32 are mounted to the fixed plate 34 and the remaining five suction pipes 32 are mounted to the movable portion 35, but the present invention is not limited thereto. The number of the suction pipes 32 fixedly mounted to the holding unit 30 and the number of the suction pipes 32 movably mounted to the holding unit 30 may be any number.

Further, a camera (imaging unit) 36 capable of imaging the sheet held by the holding unit 30 is mounted to the holding unit 30.

Next, the control unit 14 that controls the operation of the sheet conveying device 100 will be described. FIG. 4 is a block diagram schematically showing a configuration example of a control system of the sheet conveying device 100.

As shown in FIG. 4, the control unit 14 includes a calculation unit 14*a*, a storage unit 14*b*, a servo control unit 14*c*, and a holding-unit control unit 14*d*.

The control unit 14 is, for example, a robot controller equipped with a computer, such as a microcontroller. It should be noted that the control unit 14 may be configured from a single control unit 14 that performs centralized control, or may be configured from a plurality of control units 14 that perform distributed control in cooperation with each other.

The storage unit 14*b* stores information, such as a basic program as a robot controller, and various fixed data. The calculation unit 14*a* controls various operations of the robot 1 by reading and executing software, such as the basic program stored in the storage unit 14*b*. That is, the calculation unit 14*a* generates control commands for the robot 1 and outputs the generated control commands to the servo control unit 14*c* and the holding-unit control unit 14*d*. The servo control unit 14*c* is configured so as to control the drive of the servo motors corresponding to the joints J1 to J4 of each of the first robot arm 13A and the second robot arm 13B of the robot 1 on the basis of the control commands generated by the calculation unit 14*a*.

The holding-unit control unit 14*d* controls the suction, movement, and operation by the holding unit 30, by controlling the vacuum generator and a drive unit on the basis of the control commands generated by the calculation unit 14*a*.

FIG. 5 shows a plan view of the sheet to be conveyed. As shown in FIG. 5, the sheet to be conveyed by the conveying device 100 is divided into a plurality of regions. The sheet is divided into the plurality of regions, and a single substrate is produced from one of the plurality of divided regions. For that purpose, each individual divided region in the sheet is taken out as a region to be used as a substrate in a post-step. In order to facilitate cutting the sheet at this time, a plurality of holes are intermittently provided in the sheet along a line 51 that divides each of the plurality of regions. Since the plurality of holes are formed in the sheet, the sheet is torn off easily along the line on which the plurality of holes are intermittently formed, and easily cut.

Furthermore, in this embodiment, the line 51 that divides each of the plurality of regions in the sheet is used as a pattern. In addition, the plurality of holes intermittently provided along the line 51 that divides each of the plurality of regions are used as a pattern. When confirming the position of the sheet, the position of the sheet is recognized by recognizing the position of the line 51 dividing each of the plurality of regions, the line 51 serving as a pattern. Since the line 51 dividing each of the plurality of regions in the sheet is used as a pattern, it is not necessary to newly provide a pattern for recognizing the position of the sheet. Therefore, the configuration of the sheet can be simplified, and the manufacturing cost of the sheet can be minimized.

The operation when a sheet is conveyed by the sheet conveying device 100 configured as described above will be described. FIG. 6 shows a flowchart when a sheet is conveyed by the sheet conveying device 100. Hereinafter, the steps during conveyance of the sheet will be described with reference to the flowchart of FIG. 6.

When conveying the sheet shown in FIG. 5, firstly, the sheet is held by the holding unit 30 (S1).

FIGS. 7(*a*) to 7(*d*) are front views of the holding unit 30 and the sheet when the holding unit 30 holds the sheet and brings the sheet into a stretched state. As shown in FIG. 7(*a*), the holding unit 30 moves and approaches the sheet placed on the table. As shown in FIG. 7(*b*), the holding unit 30 is moved until the suction ports 31 in the holding unit 30 makes contact with the sheet.

Upon contact with the sheet, the holding unit 30 sucks air from the suction ports 31, thereby attaching the sheet to the suction ports 31. Thus, the holding unit 30 holds the sheet by suction (sheet holding step). When the holding unit 30 holds the sheet by suction, as shown in FIG. 7(*c*), the holding unit 30 moves upward to bring the sheet into a floating state. At this time, the sheet may be slightly deformed.

When the sheet is brought into a floating state, the movable portion 35 of the holding unit 30 is moved with respect to the fixed plate 34, as shown in FIG. 7(*d*). At this time, only the suction pipes 32 mounted to the movable portion 35 are moved in the direction of arrow B shown in FIG. 7(*d*). With the movement of the movable portion 35 with respect to the fixed plate 34, the suction pipes 32 mounted to the movable portion 35 are moved with respect to the suction pipes 32 mounted to the fixed plate 34. Thus, only some of the suction pipes 32 to which the sheet is attached by suction are moved. Therefore, the sheet is held in a stretched state (sheet stretching step).

When the sheet is brought into a stretched state, the sheet is imaged by the camera 36 mounted on the holding unit 30. When the sheet is imaged, the position of the pattern formed on the sheet is image-recognized. Thus, the position of the pattern is recognized by the sheet conveying device 100 (S3). Furthermore, the position of the sheet is recognized on the basis of the recognized position of the pattern (S4). Thus, the position of the sheet in a state of being held by the holding unit 30 is recognized by the sheet conveying device 100 (sheet state recognition step).

In this manner, in this embodiment, as the sheet state recognition step, the position of the sheet in a state of being held by the holding unit 30 is recognized. Therefore, here, the position of the sheet is recognized as the state of the sheet. At this time, the camera 36 for imaging the sheet and the control unit 14 for controlling the operation of the sheet conveying device 100 serve as a sheet state recognizer that recognizes the state of the sheet.

When the position of the sheet is recognized, the holding unit 30 conveys the sheet to a conveyance target position on the basis of the recognized position of the sheet (S5) (sheet conveying step). The conveyance of the sheet is performed by the holding unit 30 moving while holding the sheet. At this time, the position of the sheet held by the holding unit 30 is accurately recognized, and therefore it is possible to accurately convey the sheet to the conveyance target position.

When the holding unit 30 holds the sheet by suction, the position where the sheet is held on the holding unit 30 may vary. In this embodiment, even if a variation occurs in the position where the sheet is held and the sheet is displaced every time the sheet is held, the position of the sheet can be accurately recognized. It is therefore possible to convey the sheet while correcting displacements of the sheet during the conveyance of the sheet. Thus, the sheet can be accurately conveyed to the conveyance target position regardless of the position where the sheet is held. It is therefore possible to stably convey the sheet with high accuracy without causing variations each time the sheet is conveyed.

In this embodiment, a pin is provided at a target position in the destination to which the sheet is to be conveyed, and a hole is formed at a position in the sheet, which corresponds to the pin. By inserting the pin at the target position into the hole of the sheet, the sheet is set at the target position in the destination to which the sheet is to be conveyed. Since the sheet can be disposed with high accuracy at the conveyance target position, even if the tolerance between the pin at the target position and the hole in the sheet is severe, the pin can be inserted into the hole. In this embodiment, a hole having a diameter of 2 mm is formed in the sheet, and a pin having a diameter of 1.95 mm is formed at the conveyance target position.

It should be noted that the state of the sheet recognized by the sheet state recognizer may be another state. Instead of the position of the sheet held by the holding unit 30, another state may be recognized.

When the sheet is conveyed to the target position, the sheet held by the holding unit 30 is released there and dried. Then the sheet is held by suction again, pulled and brought into a stretched state. When the sheet is brought into a stretched state, the sheet is inspected in that state.

Furthermore, when the sheet is conveyed to the target position, a circuit is formed on the sheet to produce a substrate. FIG. 8 shows a cross-sectional view of the sheet in the steps when a circuit is formed on the sheet to produce a substrate.

As shown in FIG. 8(*a*), a copper foil 53 is disposed on the sheet 50 with an adhesive 52 interposed therebetween. Furthermore, a photoresist 54 is disposed on the copper foil 53.

As shown in FIG. 8(*b*), a circuit pattern is transferred onto the photoresist by exposure through a mask. At this time, in only the portions of the copper foil 53 serving as electricity-conducting copper wire, the photoresist 54 is exposed to light and cured.

As shown in FIG. 8(*c*), the portions of the photoresist 54 other than the portions exposed to light are removed. As a result, only the cured portions exposed to light remain on the copper foil 53.

As shown in FIG. 8(*d*), the remaining portions of the photoresist 54 are used as an etching stop layer, and the copper foil 53 is etched. Thus, the copper foil 53 located immediately below the remaining portions of the photoresist 54 serving as an etching stop layer remains on the sheet 50 together with the photoresist 54, and the other portions of the copper foil 53 are removed from the sheet 50 by etching.

Thereafter, as shown in FIG. 8(*e*), the photoresist 54 is removed. Thus, the copper foil 53 corresponding to the circuit is formed on the sheet 50, and a substrate is produced from the sheet 50.

In this embodiment, as shown in FIG. 8(b), during the stage where the sheet 50 on which the copper foil 53 and the photoresist 54 are arranged is exposed to light, the sheet 50 is accurately disposed at the conveyance target position. Therefore, during the printing of a circuit pattern on the photoresist 54 located above the sheet 50 by exposure in order to form a circuit on the sheet 50, the sheet 50 is accurately disposed. Thus, the circuit pattern is accurately printed at an appropriate position on the sheet 50. As a result, a high-quality substrate in which the circuit is formed at an accurate position can be produced.

As described above, if a circuit is printed on the sheet after the conveyance of the sheet to produce a substrate, the circuit can be accurately printed on the sheet, and the quality of the substrate can be maintained high.

It should be noted that while in the above-described embodiment, the holding unit 30 holds the sheet by suction, but the present invention is not limited thereto. The sheet may be held by the holding unit in other way than suction. The sheet may be held by the holding unit, by engagement between the pin and the hole or by being clamped. In addition, the sheet may be held in another way.

Moreover, while in the above-described embodiment, the sheet is conveyed and then a circuit is formed on the sheet to produce a substrate, the present invention is not limited to the above-described embodiment. Other steps may be performed after the conveyance of the sheet. Other steps may be performed as long as the sheet is conveyed to the target position and the effect can be obtained by accurately conveying the sheet to the target position.

Furthermore, it may be recognized in advance from the position of the sheet recognized in the step S5 whether or not the sheet can be conveyed to the conveyance target position by the holding unit 30. When the sheet is brought into a stretched state and held by the holding unit 30, it may be recognized that the sheet cannot be conveyed to the conveyance target position depending on the state of the sheet. For example, there may be cases where the sheet cannot be conveyed to the conveyance target position by the sheet conveying device according to the above-described embodiment due to the damage of the sheet or the like. In those cases, it may be recognized from the recognized position of the sheet whether or not the sheet can be conveyed to the conveyance target position by the holding unit 30. If it is recognized whether or not the sheet can be conveyed to the conveyance target position by the holding unit 30 and the sheet cannot be conveyed to the conveyance target position, the sheet may not be conveyed.

Moreover, while in the above-described embodiment, the pattern formed on the sheet is the line 51 that divides each of the plurality of regions, the invention is not limited thereto. Other patterns may be formed on the sheet. For example, the position of the sheet may be recognized by forming a design on the surface of the sheet and recognizing the position of the design. Also, other forms of patterns may be formed on the sheet.

Furthermore, while in the above-described embodiment, the camera 36 for capturing an image of the sheet is mounted to the holding unit 30, the present invention is not limited to the above-described embodiment. The position where the camera 36 is mounted may be another position. For example, the camera 36 may be provided on the support base 12 of the sheet conveying device 100. As long as the position of the sheet can be confirmed, the camera 36 may be mounted to a position other than the holding unit.

Moreover, while in the above-described embodiment, the camera is used as an image-capturing unit, the present invention is not limited to the above-described embodiment. The position of the sheet may be recognized by image-capturing units other than cameras that capture still images. For example, the position of the sheet may be recognized by an imaging unit that captures a video.

Furthermore, while in the above-described embodiment, the position of the sheet is recognized from the image captured by the camera 36, the present invention is not limited to the above-described embodiment. A sheet position recognizer may be other than the camera. For example, an optical sensor may be used.

Second Embodiment

Next, a sheet conveying device according to a second embodiment of the present invention will be described. Note that description of the portions configured in the same manner as the above-described first embodiment will not be given here, and only different portions will be described.

In the first embodiment, it has been described that the position of the pattern formed on the sheet is recognized, the position of the sheet is recognized from the position of the pattern, and the holding unit conveys the sheet to the target position on the basis of the recognized position of the sheet. Meanwhile, in the second embodiment, the type of the sheet is recognized from an identifier formed on the sheet, and the sheet is conveyed to a sheet conveyance position allocated for each type on the basis of the type of the sheet.

FIG. 9 shows a flowchart of sheet conveyance according to the second embodiment. The steps from when the sheet is held until the sheet is brought into a stretched state are the same as the flow of the first embodiment shown in FIG. 6.

When the sheet is brought into a stretched state, the camera 36 captures an image of the sheet (S6). The sheet is formed with a mark serving as an identifier that indicates the type of the sheet.

When the sheet is imaged in a stretched state, the type of the sheet is recognized from the mark formed on the sheet (S7).

In this embodiment, the sheet conveyance position allocated for each sheet type is set in advance. When the type of the sheet is recognized, the sheet is conveyed to the sheet conveyance position for the sheet based on the type of the sheet (S8). Thus, the sheet is accurately conveyed to the sheet conveyance position set for the sheet.

For example, clothing may be applied as a sheet conveyed by the sheet conveying device according to this embodiment. When conveying clothing, firstly, the holding unit 30 holds the clothing. The holding unit 30 brings the clothing into a stretched state while holding the clothing. The clothing in a stretched state is imaged by the camera 36, and the type of clothing is recognized from the mark formed on the clothing. When the type of clothing is recognized, the clothing is conveyed to a conveyance position set for the clothing.

It should be noted that while in the above embodiment, the mark is used as an identifier that indicates the type of the sheet, the present invention is not limited thereto. For example, a design may be formed on the sheet as the identifier that indicates the type of the sheet. Alternatively, other identifiers may be used as the identifier that indicates the type of the sheet.

REFERENCE SIGNS LIST 14 control unit
30 holding unit
36 camera

The invention claimed is:

1. A sheet conveying device comprising:
a holder capable of holding a sheet, bringing the sheet into a stretched state while holding the sheet, and conveying the held sheet; and
a sheet state recognizer that recognizes a state of the sheet when the sheet is held in a stretched state by the holder, wherein:
the sheet is divided into a plurality of regions,
the sheet is provided with a line that divides each of the plurality of regions,
the sheet state recognizer recognizes a position of the sheet by recognizing a position of the line that divides each of the plurality of regions,
the holder conveys the sheet to a conveyance target position on a basis of the position of the sheet recognized by the sheet state recognizer, and
a single substrate is produced from one of the plurality of divided regions in the sheet.

2. The sheet conveying device according to claim 1, wherein the sheet state recognizer recognizes, from the recognized position of the sheet, whether or not the sheet can be conveyed to the conveyance target position by the holder.

3. The sheet conveying device according to claim 1, wherein the sheet state recognizer recognizes a type of the sheet.

4. The sheet conveying device according to claim 3, wherein the sheet is conveyed to a sheet conveyance position allocated for each type on the basis of the type of the sheet recognized by the sheet state recognizer.

5. The sheet conveying device according to claim 3, wherein
the sheet is provided with an identifier that indicates the type of the sheet, and
the sheet state recognizer recognizes the type of the sheet from the identifier.

6. The sheet conveying device according to claim 5, wherein the identifier is a mark.

7. The sheet conveying device according to claim 5, wherein the identifier is a design.

8. The sheet conveying device according to claim 1, wherein
the sheet state recognizer has an imaging unit that captures an image of the sheet, and
the sheet state recognizer recognizes the state of the sheet from the image captured by the imaging unit.

9. The sheet conveying device according to claim 1, wherein the holder is configured from a robot arm.

10. A sheet conveying method for conveying a sheet using a sheet conveying device including a holder capable of holding a sheet that is divided into a plurality of regions such that a single deformable substrate is produced from one of the plurality of divided regions, bringing the sheet into a stretched state, and conveying the sheet, and a sheet state recognizer that recognizes a state of the sheet, the method comprising:
a sheet holding step of holding the sheet;
a sheet stretching step of bringing the sheet into a stretched state;
a sheet state recognition step of recognizing a position of the sheet by recognizing a position of a line that divides each of the plurality of regions; and
a sheet conveying step of conveying the sheet on the basis of the position of the sheet recognized in the sheet state recognition step.

* * * * *